United States Patent
Simpson

(10) Patent No.: US 7,543,550 B2
(45) Date of Patent: Jun. 9, 2009

(54) PET TOY AND EXERCISE DEVICE

(76) Inventor: Kevin Brooks Simpson, 5300 Coldsprings Rd., Concord, NC (US) 28025

( * ) Notice: Subject to any disclaimer, the term of this patent is extended or adjusted under 35 U.S.C. 154(b) by 122 days.

(21) Appl. No.: 11/688,301

(22) Filed: Mar. 20, 2007

(65) Prior Publication Data
US 2007/0215063 A1    Sep. 20, 2007

Related U.S. Application Data

(60) Provisional application No. 60/784,116, filed on Mar. 20, 2006.

(51) Int. Cl.
*A01K 15/02* (2006.01)
(52) U.S. Cl. ...................................... 119/708
(58) Field of Classification Search ................ 119/708, 119/707, 702, 709, 710, 711; D30/160
See application file for complete search history.

(56) References Cited

U.S. PATENT DOCUMENTS

| 2,040,522 | A | * | 5/1936 | Marx | 473/576 |
| 2,698,598 | A | * | 1/1955 | Hadley | 119/708 |
| 3,351,343 | A | * | 11/1967 | Papp | 473/430 |
| 3,459,158 | A | * | 8/1969 | Mitchell, Jr. | 119/708 |
| 4,321,888 | A | * | 3/1982 | Topliffe | 119/709 |
| 4,884,807 | A | * | 12/1989 | Welch | 473/575 |
| 4,948,137 | A | * | 8/1990 | Alvarez | 473/575 |
| D343,930 | S | * | 2/1994 | Garcia | D30/160 |
| 5,282,615 | A | * | 2/1994 | Green et al. | 473/418 |
| 5,357,904 | A | * | 10/1994 | Takahashi et al. | 119/708 |
| 5,713,805 | A | * | 2/1998 | Scher et al. | 473/426 |
| 6,142,889 | A | * | 11/2000 | Schaubach | 473/426 |
| 6,152,838 | A | * | 11/2000 | Killion | 473/424 |
| 6,318,300 | B1 | * | 11/2001 | Renforth et al. | 119/708 |
| 6,474,260 | B1 | * | 11/2002 | Shultz | 119/51.03 |
| 6,490,998 | B1 | | 12/2002 | Rocher | |
| 6,601,539 | B1 | * | 8/2003 | Snook | 119/710 |
| D513,546 | S | * | 1/2006 | Comerford | D30/160 |
| D514,753 | S | * | 2/2006 | Crane et al. | D30/160 |
| 7,115,052 | B2 | * | 10/2006 | Wardle et al. | 473/459 |
| 7,219,626 | B2 | * | 5/2007 | Hurwitz | 119/707 |
| 2004/0107917 | A1 | * | 6/2004 | Gerlach | 119/708 |
| 2007/0062461 | A1 | * | 3/2007 | Lubeck | 119/709 |

* cited by examiner

*Primary Examiner*—Yvonne R. Abbott
(74) *Attorney, Agent, or Firm*—Adams Intellectual Property Law, P.A.

(57) ABSTRACT

A pet toy and exercise device comprising a first length non-elastic of cord extending from a ball in one direction, an elastic cord coupled to the first length of non-elastic cord, and a shorter length of non-elastic cord providing a chewing or grasping aid extending from the ball in another direction. A method of using a pet toy and exercise device is also disclosed.

7 Claims, 5 Drawing Sheets

PET TOY AND EXERCISE DEVICE

TECHNICAL FIELD AND BACKGROUND OF THE INVENTION

The present invention relates to the field of pet toys and exercise devices. In particular, the invention relates to a pet toy and exercise device that allows a pet to exercise on its own.

The health of a pet is dependent on several factors. One very important factor is exercise. Exercise helps the pet keep its muscles and joints in good condition, and keep its body fat at a healthy level. Unfortunately, many pets do not get the amount of exercise that they need. This is often a result of pet owners having a schedule that takes up the majority of their time, thereby leaving little time for playing with or exercising their pets.

Accordingly, there is a need for a pet toy and exercise device that allows a pet to play and exercise on its own without the aid of the pet owner.

SUMMARY OF THE INVENTION

Therefore it is an object of the invention to provide a pet toy and exercise device that can be hung from a support structure.

It is another object of the invention to provide a pet toy and exercise device that requires limited space.

It is another object of the invention to provide a pet toy and exercise device that provides a variable resistance to pulling or tugging by a pet.

It is another object of the invention to provide a pet toy and exercise device that allows a pet to swing and chase the device.

These and other objects of the invention are achieved in the preferred embodiments disclosed below by providing a pet toy and exercise device including a ball, a first length non-elastic of cord extending from the ball in one direction, an elastic cord coupled to the first length of non-elastic cord, and a shorter length of non-elastic cord providing a chewing or grasping aid extending from the ball in another direction.

According to another preferred embodiment of the invention, the pet toy and exercise device includes a connector for coupling the length of non-elastic cord and the length of elastic cord.

According to another preferred embodiment of the invention, the pet toy and exercise device includes a hook for hanging the device.

According to another preferred embodiment of the invention, the pet toy and exercise device includes a hook for receiving the rope.

According to another preferred embodiment of the invention, the one direction and the other direction are axially aligned.

According to another preferred embodiment of the invention, the pet toy and exercise device includes straps for retaining a ball, a first length of non-elastic cord coupled to one of the straps to extend in one direction, a shorter length of non-elastic cord providing a chewing or grasping aid coupled to the straps to extend in another direction, an elastic cord coupled to the first length of non-elastic cord.

According to another preferred embodiment of the invention, the pet toy and exercise device further includes a ball.

According to another preferred embodiment of the invention, the ball is removable from the straps.

According to another preferred embodiment of the invention, the ball is a soccer ball or basketball.

According to another preferred embodiment of the invention, a hook or clevis couples the length of non-elastic cord to the elastic cord.

According to another preferred embodiment of the invention, the one direction and the other direction are opposite directions.

According to another preferred embodiment of the invention, the shorter length of non-elastic cord is a rope.

According to another preferred embodiment of the invention, a method includes the step of providing a pet toy and exercise device. The device includes a ball, a first length non-elastic of cord extending from the ball in one direction, an elastic cord coupled to the first length of non-elastic cord, and a shorter length of non-elastic cord providing a chewing or grasping aid extending from the ball in another direction. The method also includes the steps of hanging the device from an end of the elastic cord, turning a pet dog loose on the device to play and exercise, watching the dog play and exercise, experiencing entertainment from watching the dog play with the device.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Figure 1:
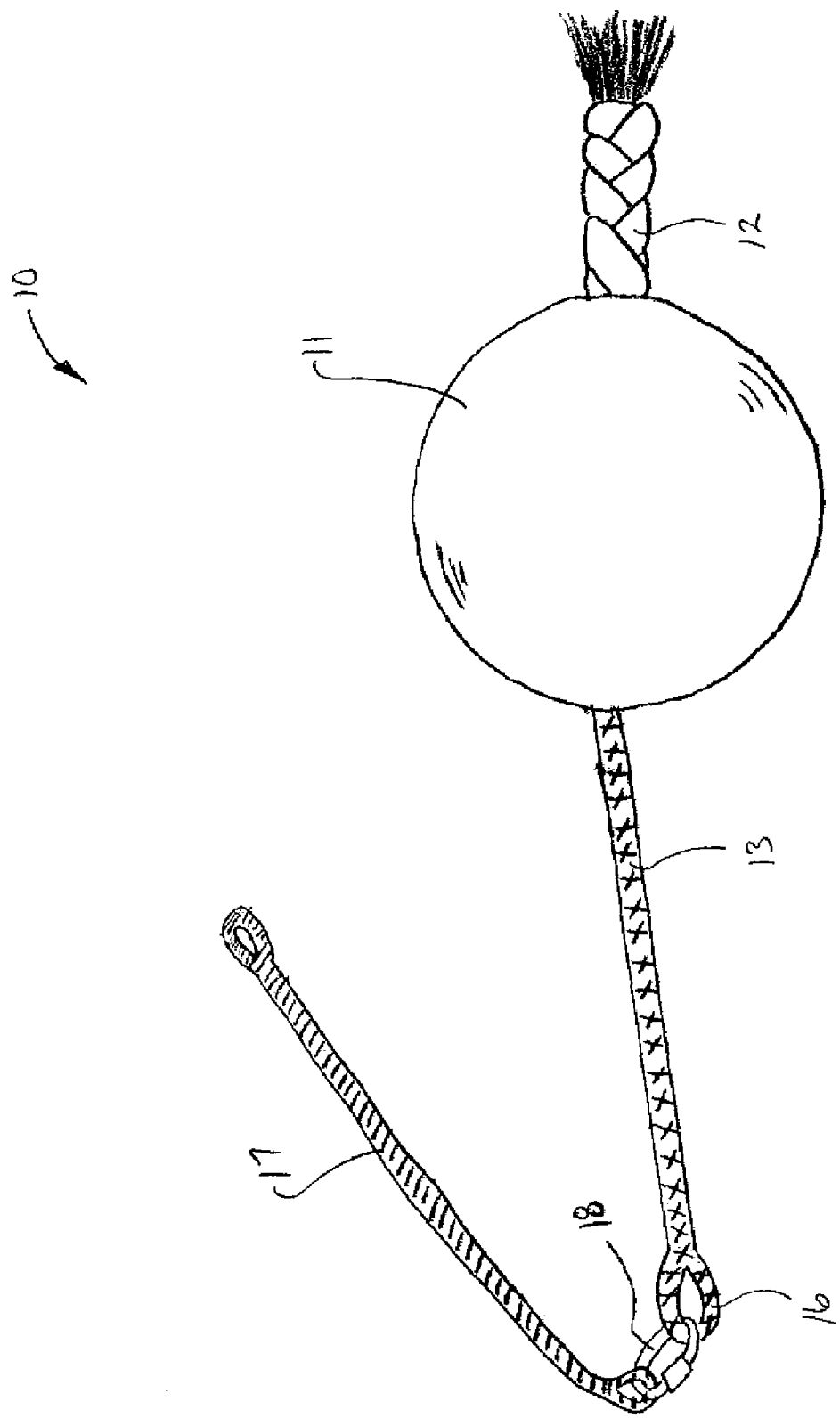
FIG. 1 shows a pet toy and exercise device according to an embodiment of the invention.

Referring now specifically to the drawings, a pet toy and exercise device according to an embodiment of the invention is illustrated in FIG. 1 and shown generally at reference numeral 10. The device 10 includes a ball 11 having a chewing or gripping device, such as a rope 12 extending from a first side of the ball 11, and a non-elastic cord 13 extending from a second opposing side of the ball 11.

The cord 13 includes a loop 16, or other suitable connecting means, for allowing the cord 13 to be connected to elastic cord 17 by a connector 18, such as a clamp, hook, or clevis. This allows multiple cords to be connected together to form a cord of desired length. As illustrated, cord 13 is a non-elastic braided rope and cord 17 is an elastic bungee-type cord. It should be appreciated that cord 13 may be elastic and cord 17 non-elastic. It should also be appreciated that a single elastic cord may be used instead of the two connected cords 13 and 17.

Figure 2:
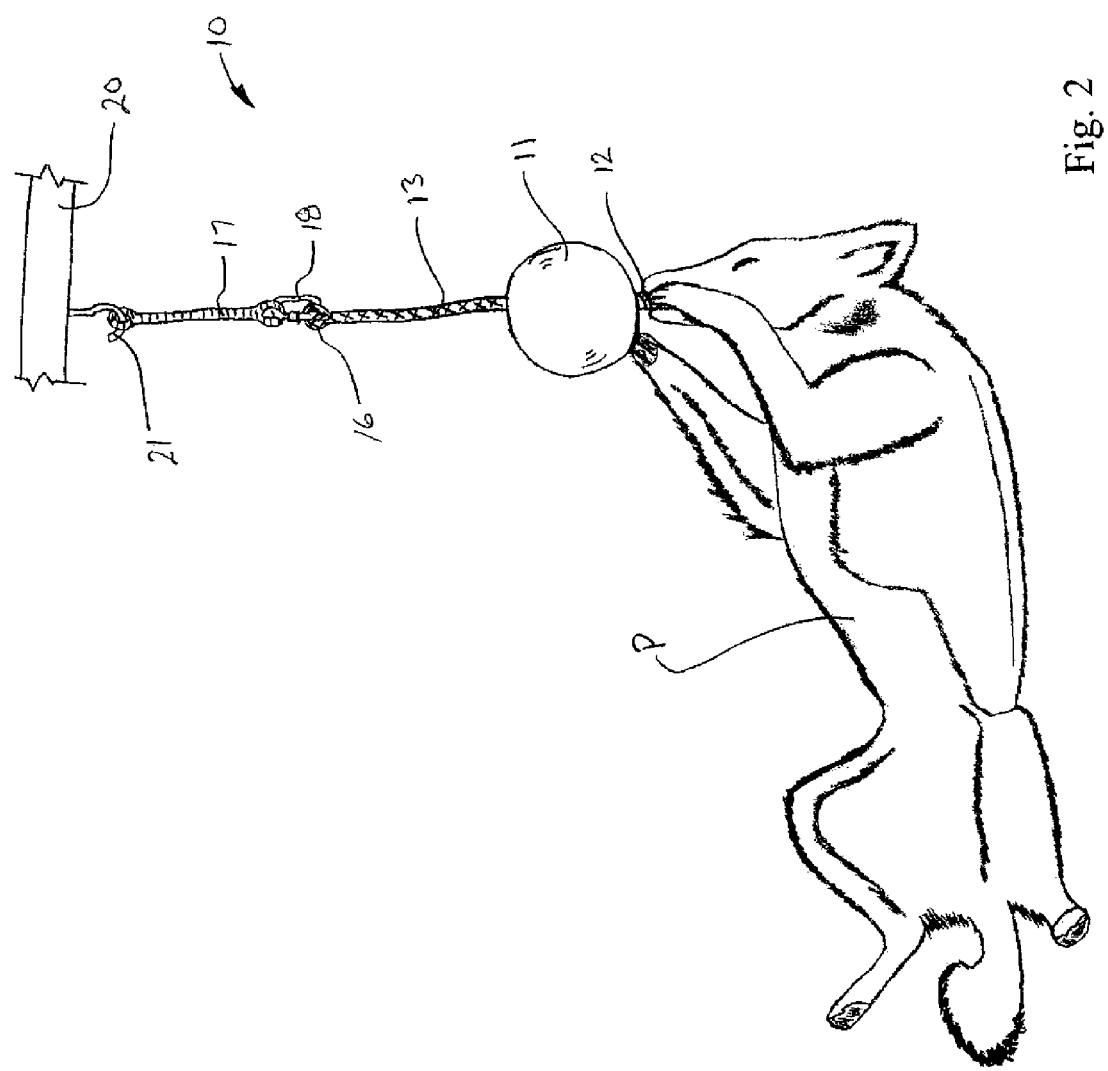
FIG. 2 shows a pet playing with the pet toy and exercise device of FIG. 1 hanging from a support.
Figure 3:
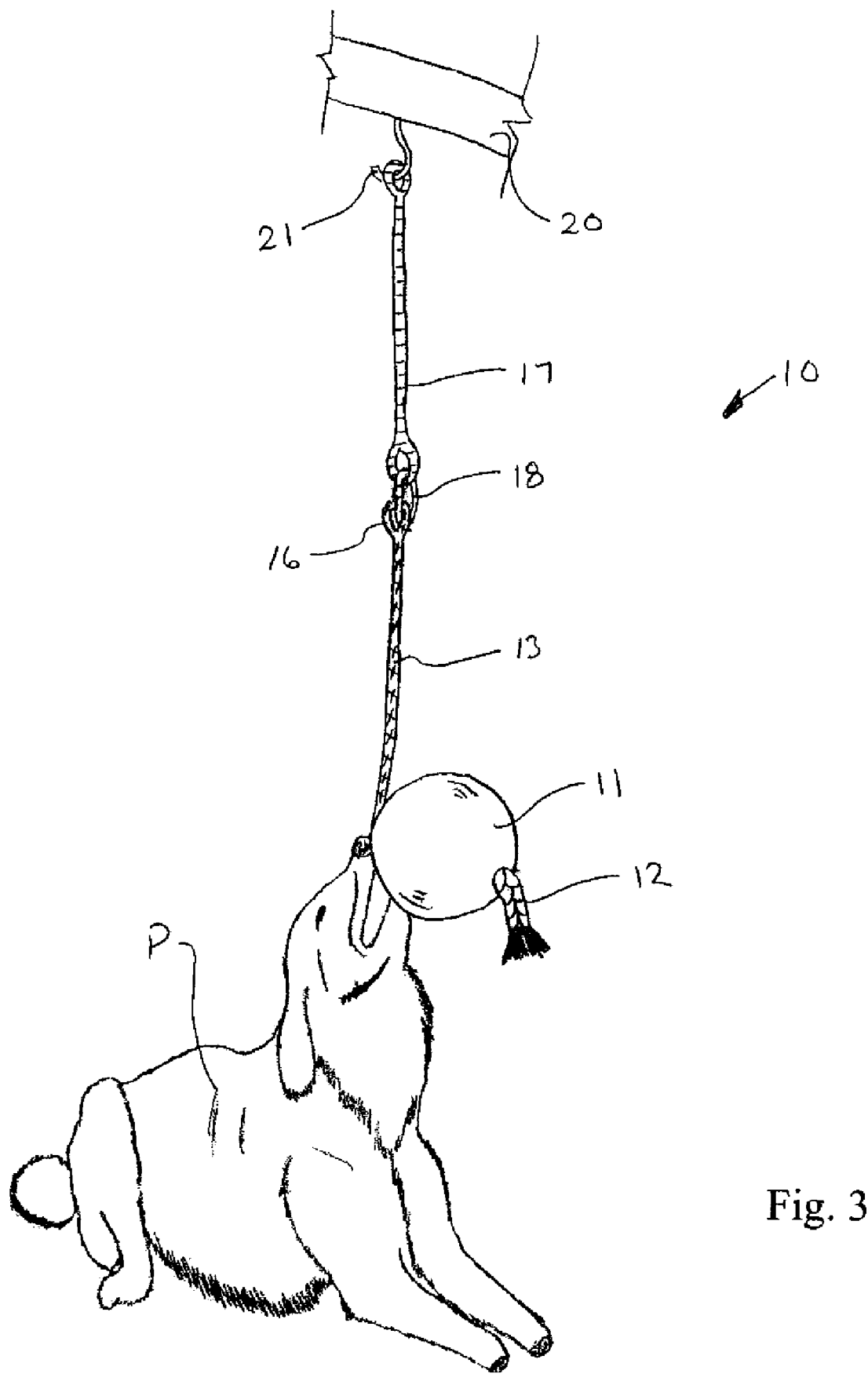
FIG. 3 shows a pet playing with the pet toy and exercise device of FIG. 1.

Referring to FIGS. 2 and 3, the cords 13 and 17 allow the ball 11 to be hung from a support 20 to allow a pet "P" to play with the device 10. The cords 13 and 17 are secured to the support 20 by a hook 21. The cords 13 and 17 may also be secured to the support 20 by any other suitable means, such as rope. As shown, the rope 12 provides the pet P with a chewing aid and allows the pet P to tug or pull on the device 10. When pulling on the device 10, the cord 17 expands or lengthens while providing resistance, thereby aiding in the exercising of the pet P. The cords 13 and 17 also allow the pet P to "swing" the ball.

As illustrated in FIG. 3, the pet P may also bite the cord 13 to pull on the device 10. By using a non-elastic material, such as rope, for the cord 13, increased wear resistance may be obtained to prevent breaking, cutting, or tearing of the cord 13 caused by the pet P's teeth.

Figure 4:
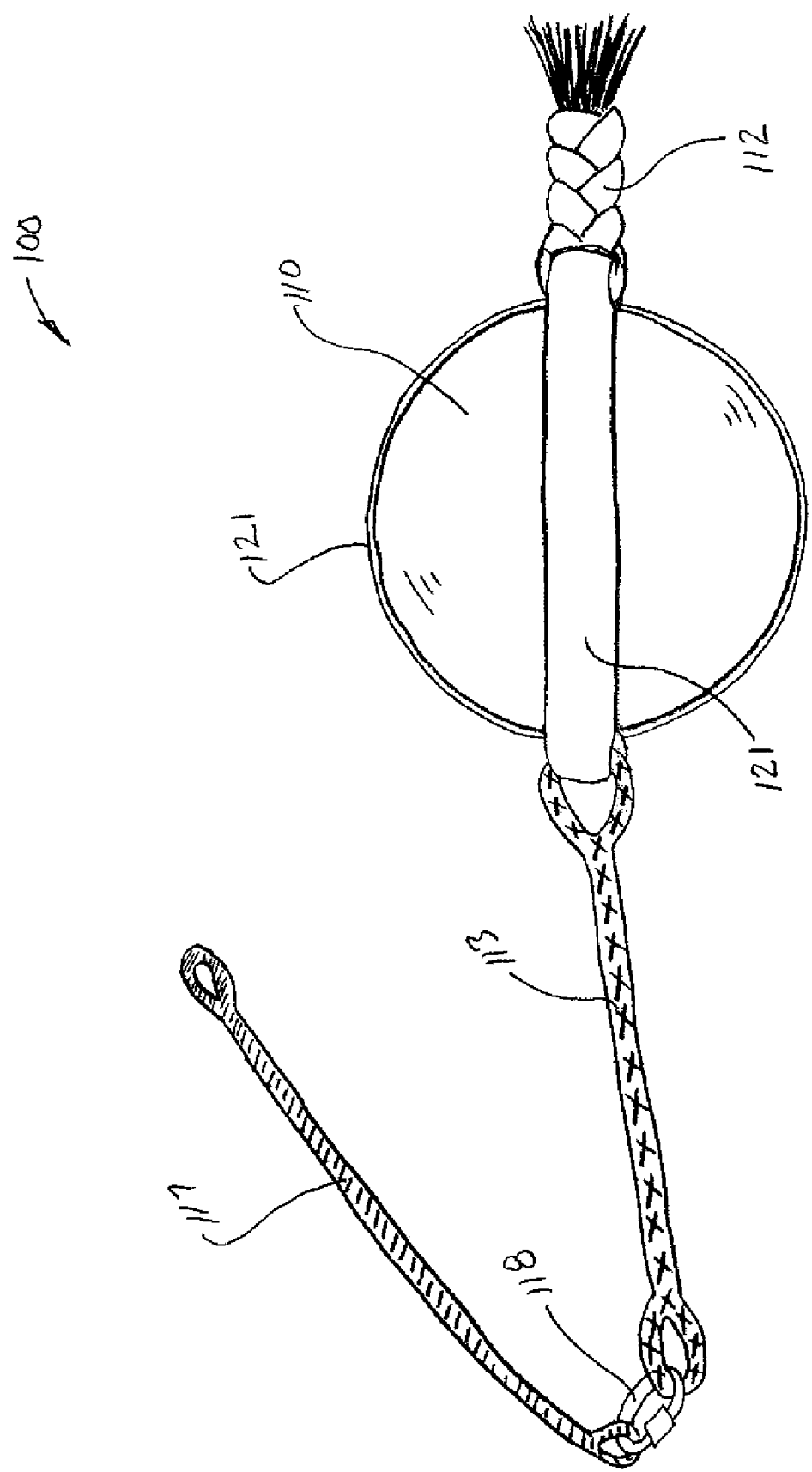
FIG. 4 shows a pet toy and exercise device according to an embodiment of the invention.
Figure 5:
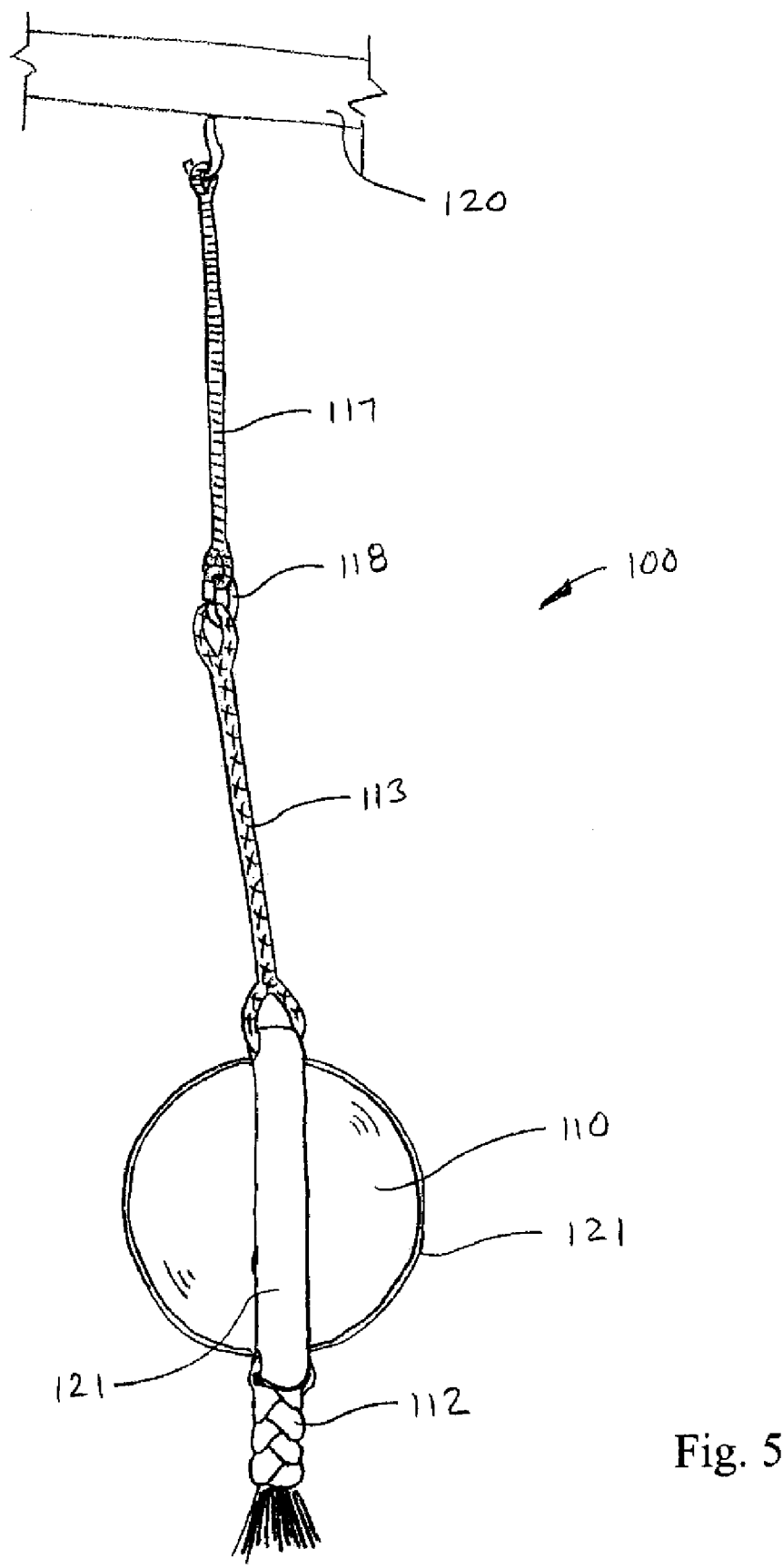
FIG. 5 shows the pet toy and exercise device of FIG. 4 hanging from a support.

Referring to FIG. 4, a pet toy and exercise device according to another embodiment of the invention is shown generally at reference numeral 100. Like device 10, device 100 includes a ball 110, a rope 112, a non-elastic cord 113, and an elastic cord 117 connected to the cord 113 by a connector 118. As illustrated in FIG. 5, the device 100 may be hung from a support 120.

The device 100 further includes a strap 121 for surrounding the ball 110. Unlike the device 10, the rope 112 and cord 113 do not extend directly from the ball 110. Instead, the rope 112 and cord 113 extend from the strap 121, and the ball 110 is secured within the strap 121. This allows the ball 110 to be easily replaced when worn out. It also allows the use of any suitable type of ball 110, such as a soccer ball or basketball.

A pet toy and exercise device is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A pet toy and exercise device comprising:
   (a) straps for retaining a ball;
   (b) a first length of non-elastic cord coupled to the straps to extend in one direction;
   (c) a shorter length of non-elastic cord providing a chewing or grasping aid coupled to the straps to extend in another direction; and
   (d) an elastic cord coupled to the first length of non-elastic cord.

2. A pet toy and exercise device according to claim 1 further comprising a ball.

3. A pet toy and exercise device according to claim 2 wherein the ball is removable from the straps.

4. A pet toy and exercise device according to claim 3 wherein the ball is a soccer ball or basketball.

5. A pet toy and exercise device according to claim 1 further comprising a clamp, hook or clevis coupling the length of non-elastic cord to the elastic cord.

6. A pet toy and exercise device according to claim 1 wherein the one direction and the other direction are opposite directions.

7. A pet toy and exercise device according to claim 1 wherein the shorter length of non-elastic cord is a rope.

\* \* \* \* \*